US011301164B1

(12) United States Patent
Markle et al.

(10) Patent No.: US 11,301,164 B1
(45) Date of Patent: Apr. 12, 2022

(54) MULTI-ACTUATOR STORAGE DEVICE WITH ACTUATOR SELECTION

(71) Applicant: Amazon Technologies, Inc., Seattle, WA (US)

(72) Inventors: Seth W. Markle, Seattle, WA (US); Thomas Grant Slatton, Seattle, WA (US); Andrew Kent Warfield, Vancouver (CA); Munif M. Farhan, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 44 days.

(21) Appl. No.: 16/712,499

(22) Filed: Dec. 12, 2019

(51) Int. Cl.
G06F 3/06 (2006.01)

(52) U.S. Cl.
CPC ............ *G06F 3/0658* (2013.01); *G06F 3/064* (2013.01); *G06F 3/0611* (2013.01); *G06F 3/0622* (2013.01); *G06F 3/0646* (2013.01); *G06F 3/0659* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 6,563,657 B1* | 5/2003 | Serrano | G11B 5/5547 360/48 |
| 10,090,010 B1* | 10/2018 | Erden | G11B 5/58 |
| 10,803,893 B1* | 10/2020 | Zhang | G11B 5/5578 |
| 2003/0204687 A1* | 10/2003 | Hyde, II | G06F 3/0601 711/158 |
| 2007/0035868 A1* | 2/2007 | van Zyl | G11B 5/5578 360/69 |
| 2007/0112888 A1* | 5/2007 | Rajakarunanayake | G11B 27/034 |
| 2016/0260458 A1* | 9/2016 | Gartee | G11B 5/4886 |
| 2018/0174613 A1* | 6/2018 | Zhu | G11B 5/012 |
| 2020/0020357 A1* | 1/2020 | Dunn | G11B 5/5526 |
| 2020/0294540 A1* | 9/2020 | Shimokawa | G11B 20/1217 |
| 2021/0096769 A1* | 4/2021 | Calfee | G06F 3/0676 |

* cited by examiner

*Primary Examiner* — Edward J Dudek, Jr.
*Assistant Examiner* — Ralph A Verderamo, III
(74) *Attorney, Agent, or Firm* — Klarquist Sparkman, LLP

(57) ABSTRACT

A multi-actuator storage device includes separate actuators that can be used to access a storage medium. A property of a request can be analyzed to determine which actuator to use to access data associated with the request. For example, high-priority requests can be handled by an actuator designated for random I/O requests, whereas low-priority requests can be handled by an actuator designated for sequential I/O requests. Writes can be treated as low-priority requests. In a particular embodiment, a priority bit can be used to determine which actuator is used to access the data.

18 Claims, 6 Drawing Sheets

MULTI-ACTUATOR STORAGE DEVICE WITH ACTUATOR SELECTION

BACKGROUND

The storage device industry has started manufacturing storage devices that comprise storage media that can be accessed independently using different actuators. Such storage devices include hard drives with multiple actuators associated with different storage media. At least some hard drives with multiple actuators can use the actuators to independently access one or more platters of the hard drive. Current communication protocols that enable a computer to interface with a multi-actuator hard drive include Serial Attached SCSI (SAS), with which separate actuators of the hard drive can be associated with different logical unit numbers (LUNs).

DETAILED DESCRIPTION

Access patterns can impact the effective throughput achievable on a drive. A fully sequential workload requires little head seek time and can have high data transfer rates (e.g., 200 MB/s). When random I/Os interrupt the sequential workload, the achievable throughput drops significantly. For example, a combination of random and sequential I/Os can achieve 10 MB/s-20 MB/s per drive, which is a significant drop in throughput.

A multi-actuator storage device, such as a hard drive, includes separate actuators that can be used to access a storage medium. A property of a request can be analyzed to determine which actuator to use to access data associated with the request. For example, high-priority requests (i.e., low-latency) can be handled by an actuator designated for random access requests, whereas low-priority requests can be handled by an actuator designated for sequential access requests. Writes can also be treated as low-priority requests. In a particular embodiment, a priority bit can be used to determine which actuator is used to access the data. One advantage of the multi-actuator design is that multiple requests to access the same data location can be distributed to different actuators based on the priority requirements associated with the requests. For example, sequential reads can be grouped together, without interruption of high-priority reads, such that a sequential actuator can maximize throughput and minimize movement of the actuator head.

In another embodiment, a multi-actuator drive is disclosed wherein each actuator can access overlapping data areas. One actuator can be reserved for sequential operations, while the other actuator performs random reads. To route between actuators, writes can be routed to the sequentially optimized actuator, and reads can be divided by whether they are low-priority or high-priority requests. High-priority reads are directed to the actuator dedicated to high-priority operations, while low-priority reads are routed to the actuator that is dedicated to writes and low priority requests. An added cost advantage can be achieved by making the actuators asymmetric. For example, the sequential actuator can have write and read heads, while the random actuator can have read-only heads. By reducing one or more actuators to read only, cost and power usage are reduced.

Figure 1:
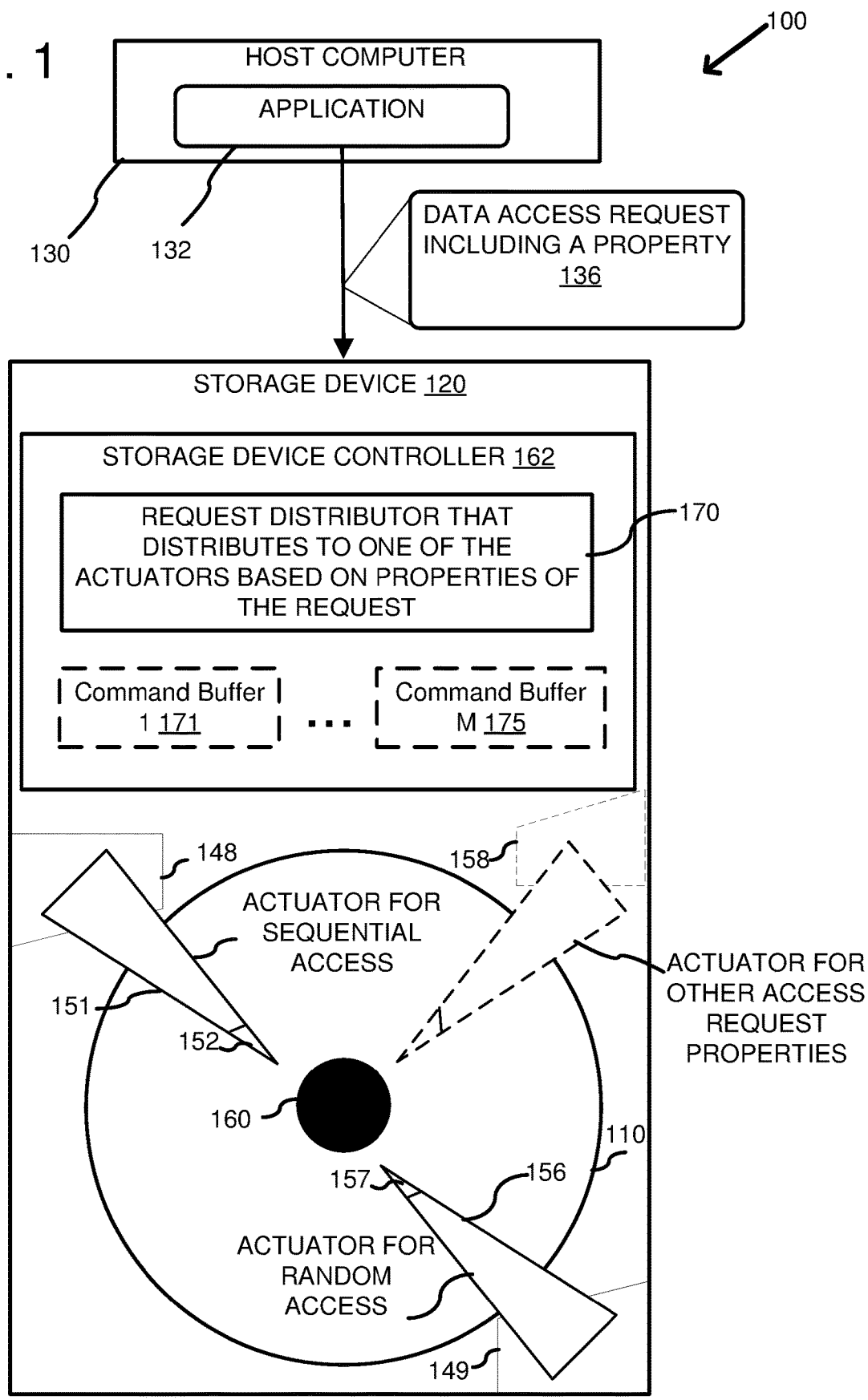
FIG. 1 is a system diagram depicting an example system for accessing a storage medium using different actuators in a storage device.

FIG. 1 is a system diagram depicting an example system 100 for accessing a storage medium 110 of a multi-actuator storage device 120. The example system 100 comprises the storage device 120 and a host computer 130 that is coupled to the storage device 120. The host computer 130 can be executing an application 132 that can make requests, such as request 136, to access (i.e., read or write) the storage device 120. Alternatively, the host computer can be an intermediate device and the application 132 receives a request to access the storage device.

The storage device 120 comprises the storage medium 110 and a plurality of actuators, shown generally at 148, 149 configured to access the storage medium 110. One or more additional actuators, such as shown in dashed lines at 158, can also be added. The storage medium 110 is depicted in FIG. 1 as a magnetic disk that is configured to rotate on a spindle 160. The storage medium 110 is a single disk or platter, but additional disks (not shown) and actuators (not shown) are typically included in the storage device 120, such as in a stacked structure, rotating on the same spindle 160.

The storage device 120 comprises a storage device controller 162. The storage device controller 162 can be configured to access the storage medium 110. Example data accesses can include reading data from the storage medium 110 and/or writing data to a storage medium 110. For example, the storage device controller 162 can be configured to rotate the storage medium 110 on the spindle 160 and to perform data read and/or write operations on the storage medium 110 via the first actuator 148. The actuator 148 can include an actuator arm 151 and a read/write head 152. The actuator arm 151 can be rotated on an actuator axis (not shown) by the actuator 148 to move the read/write head 152 over different portions of the storage medium 110. The storage device controller 162 can be configured to write data to and/or to read data from the storage medium 110 using the read/write head 152. The read/write head 152 can comprise a single head that can perform both read and write operations. Alternatively, the read/write head 152 can comprise two separate heads for reading and writing, respectively. The storage device controller 162 can be configured to use the read/write head 152 to write data to the storage medium 110 in multiple concentric circular tracks as the storage medium is rotated on the spindle 160. Each concentric circular track can include a plurality of storage locations wherein individual bits, bytes, blocks, etc. of data can be stored.

The storage device controller 162 can further be configured to access the storage medium 110 using the second actuator 149. The first actuator 148 and the second actuator 149 can be used by the storage device controller 162 to access the plurality of storage locations on the medium 110. Each actuator 148, 149 can redundantly access the same storage locations, such as by reading the same storage location on the storage medium 110. The second actuator 149 includes a moveable actuator arm 156 and a head 157, which can be used for reading and writing. In some embodiments, as further described below, the head 157 can be used only for reading, and the hardware components for writing can be eliminated to reduce costs.

If additional actuators, such as actuator 158, are used, such actuators can likewise access storage locations on the storage medium that are the same storage locations accessible by the actuators 148, 149. In some situations, having multiple actuators able to access the same data storage locations on the medium 110 allows for failover. For example, should one actuator fail, the other actuators can be used to access any desired storage location. Thus, each actuator can access the entirety of the medium 110.

The storage device controller 162 can include a request distributor 170, which is hardware, software and/or firmware that can receive requests, such as request 136, and distribute the requests to the appropriate actuator based upon the properties of the actuators. For example, the request distributor 170 can choose actuator 148 or 149 to access the storage medium 110. In order to choose which actuator to use, the request distributor 170 can analyze one or more properties of the request and determine whether the properties of the request align with the properties of the actuator. For example, the request 136 can have a property associated therewith, such as a flag bit set or other property that gives direction to the request distributor 170 which actuator 148, 149 is better suited to access the storage medium 110. The property can be based on a variety of factors including priority, type (e.g., read or write), address, etc. Each actuator 148, 149 can have different properties related to different strategies for storage. For example, actuator 148 can be optimized or assigned for sequential access, while actuator 149 can be optimized or assigned for random access (e.g., random reads and/or random writes). In a further example, actuator 148 can be optimized or assigned for writes and actuator 149 can be optimized or assigned for reads. If other actuators are used, such as actuator 158, one or more of the actuators can be optimized or have strategies for requests with other properties. In one example, the application 132 can set a priority bit in the request 136, wherein the priority bit indicates whether the request is a lower-priority request or a higher-priority request (lower desired latency). Requests with lower latency requirements can be sent to actuator 149 for immediate retrieval, even if less efficient. Requests that can withstand higher latency can be sent to actuator 148. The application 132 can set the priority bit based on the contents of a received request or based on a state of the applications or can receive a request including the priority bit from another computer (not shown) and simply pass on the request.

Optionally, the storage device controller 162 can be configured to maintain separate command buffers 171-175 associated with the plurality of actuators (148, 149, etc.) of the storage device 120. For example, the command buffer 171 can be used to process data access commands that are associated with the actuator 148. The command buffer 175 can be used to process data access commands that are associated with the actuator 149. Additional command buffers can be used to process data access commands associated with other actuators, such as actuator 158. M command buffers are shown, wherein M is any integer number corresponding to the number of actuators. Typically, 2, 3, or 4 actuators can be used, but additional actuators can be added. If the request distributor 170 determines that the request 136 is to be handled by actuator 148, then the request can be placed in the command buffer 1 171, queued for distribution to the actuator 148. Otherwise, if the request distributor 170 determines that the request 136 is more appropriate for actuator 149, then the request can be placed in the command buffer M 175. Thus, different queues can be used based on a property of the request.

One advantage of the multi-actuator design is that multiple requests to access the same data location can be distributed to different actuators based on the priority requirements associated with the requests. For example, requests that have a priority bit set to indicate high priority can be sent to actuator 149. By contrast, requests that have the priority bit set to indicate low priority or writes can be sent to actuator 148. Typically, sequential reads can be sent to the actuator 148, wherein the actuator head 152 is already in a region or track where the data access is to occur. Random reads can be sent to actuator 149, wherein the actuator head 157 may need to move to a different region or track. By grouping together sequential reads, without interruption of high-priority reads, the sequential actuator 148 can maximize throughput and minimize movement of the actuator head.

In any of the examples described herein, a storage device can be a device capable of storing data in one or more physical storage media. For example, the storage device can be a magnetic storage device, such as a hard disk drive, that is capable of storing data in one or more magnetic recording formats. Other examples of storage devices include flash storage devices (such as NAND-type flash devices and NOR-type flash devices), and random access data storage devices (such as DRAM devices). Further examples of storage devices include non-volatile dual in-line memory modules (NVDIMMs).

In some embodiments, the storage device comprises multiple disparate storage media. For example, the storage device can be a hard disk drive that comprises one or more magnetic disks and an internal memory. In another example, the storage device comprises solid state storage and magnetic storage. In another example the storage device comprises multiple magnetic disks organized as a Redundant Array of Independent Disks (RAID). Other combinations of disparate storage media are also possible.

A multi-actuator storage device is a storage device comprising multiple actuators that can be used to access storage media of the storage device. An actuator comprises one or more hardware components configured for use in accessing storage locations (such as zones, sectors, etc.) on one or more physical storage media of the storage device. For example, a hard drive comprising a magnetic disk can comprise an actuator that moves an actuator arm to various positions over a surface of the magnetic disk. In at least some multi-actuator storage devices, actuators of the storage device can be configured to access separate storage media of the storage device.

In any of the examples described herein, a storage device controller 162 can comprise one or more hardware components of a storage device. The storage device controller 162 can be configured to access a firmware stored in a read-only memory (ROM) of the device, a storage medium of the device, or some combination thereof. Additionally or alternatively, the storage device controller 162 can be implemented at an intermediate layer between an application and the device. Such an intermediate layer controller can comprise software (such as a driver) and one or more processors, a system-on-chip (SoC), a field-programmable gate array (FPGA), and/or an application-specific integrated circuit (ASIC). In some embodiments, the storage device controller 162 can be part of an application. In such an embodiment, the application may use the storage device controller to access a storage device directly, without using an intermediate layer, such as a driver. The storage device controller can be located on a computer containing the device, or on a separate computer that is connected to the device via a communication channel, such as a computer network.

In any of the examples described herein, a host computer can be a server or other computing device that comprises a processor and is connected to a storage device. The host computer is connected to the device and configured to transmit commands, such as processing commands, communication commands, data access commands (i.e., commands to perform data read and write operations), inquiry commands, firmware update commands, or the like, to the storage device. The host computer can be configured to receive command responses from the storage device. The connection can be a direct connection, such as a cable or bus connection, an indirect connection, such as a connection over a network, or some combination thereof. In scenarios where the host computer is connected to more than one device, the various connections can be of the same type or different types.

In some embodiments, the host computer can comprise a controller connected to multiple devices. In at least some embodiments, the host computer can be a computing device configured to provide a unified access point for multiple connected storage devices, such as a JBOD ("just a bunch of drives/disks") device, a RAID array controller, etc.

In any of the examples described herein, a firmware can comprise one or more software components that provide control and/or monitoring of one or more components of an electronic device. In at least some embodiments, the firmware comprises executable instructions stored in a non-volatile storage location (such as a non-volatile random access memory (NVRAM), an electronically erasable programmable read-only memory (EEPROM), a persistent storage medium, or the like). The firmware can be accessed by a device controller (such as a storage device controller) during a boot process of the device. Additionally or alternatively, the firmware can be accessed in response to one or more commands transmitted to the device from a connected computing device (such as a host computer).

The multi-actuator system can be used for reading from one actuator and writing to another actuator so as to efficiently implement data migration on the same platter of the storage device. Additionally, if one of the actuators becomes defective, the other actuator or actuators can be used as a failover. Finally, data throughput is increased because multiple actuators are operating on the same data locations. In some embodiments, cost savings can be gained by having one of the actuators as read only, while the other actuator is read/write capable.

Figure 2:
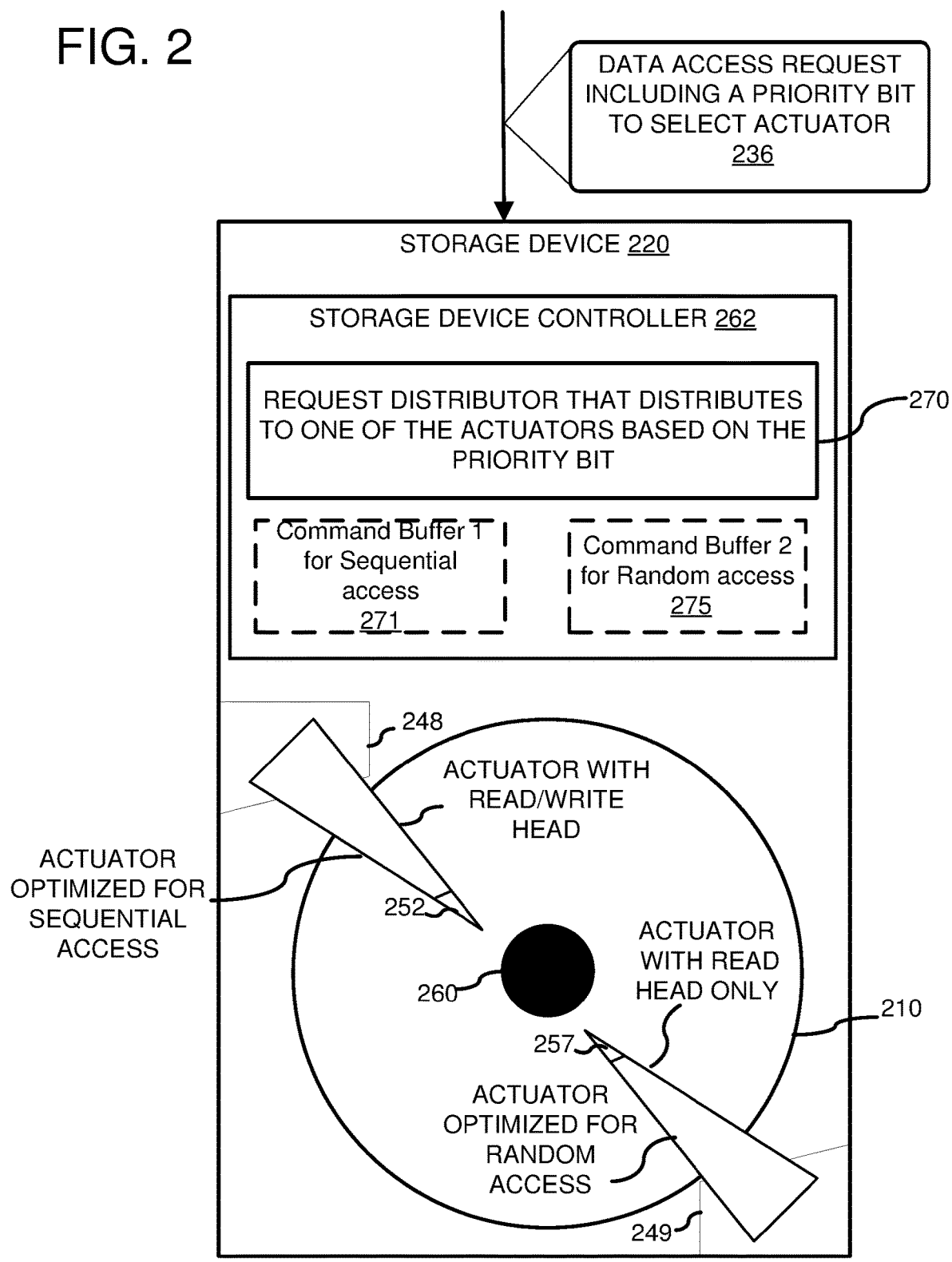
FIG. 2 is a diagram of a storage device according to another embodiment, wherein a priority bit is used to select one of two actuators.

FIG. 2 shows a specific embodiment of a dual-actuator storage device 220 that includes two actuators 248, 249, wherein the actuator 248 includes a read/write head 252 and the actuator 249 includes only a read head 257. The storage device 220 comprises a storage medium 210, which the actuators 248, 249 can access. The storage medium 210 is a magnetic disk that is configured to rotate on a spindle 260. The storage medium 210 is a single disk or platter, but additional disks (not shown) and actuators (not shown) are typically included in the storage device 220, such as in a stacked structure, rotating on the same spindle 260. Thus, in some embodiments, the actuators 248 and 249 can be configured to control a plurality of actuator arms configured to access the different platters of the storage medium 210. For example, the actuator 248 can be configured to control a plurality of actuator arms with read/write heads configured to access separate platters of the storage medium 210. Additionally, the actuator 249 can be configured to control a plurality of actuator arms with read heads configured to access the separate platters of the storage medium 210.

The storage device 220 comprises a storage device controller 262. The storage device controller 262 can be configured to access the storage medium 210. Example data access can include reading data from the storage medium 210 using either actuator 248, 249 or writing data to the storage medium using actuator 248. For example, the storage device controller 262 can be configured to rotate the storage medium 210 on the spindle 260 and to perform data read and/or write operations on the storage medium 210 via the first actuator 248. The storage device controller 262 can be configured to write data to and/or to read data from the storage medium 210 using the read/write head 252. The read/write head 252 can comprise a single head per platter that can perform both read and write operations. Alternatively, the read/write head 252 can comprise two separate heads per platter for reading and writing, respectively. The storage device controller 262 can be configured to use the read/write head 252 to write data to the storage medium 210 in multiple concentric circular tracks as the storage medium is rotated on the spindle 260. Each concentric circular track can include a plurality of storage locations wherein units of data (such as sectors, blocks, bytes, bits, etc.) can be stored. In at least some embodiments, each actuator 248, 249 can access the same storage locations of the storage medium 210.

The storage device controller 262 can include a request distributor 270, which is hardware and/or software that can receive requests, such as request 236, and distribute the requests to the appropriate actuator. For example, the request distributor 270 can choose actuator 248 or 249 to access the storage medium 210 based on the state of the priority bit in the request 236. For example, the request 236 can have a priority bit associated therewith indicating whether low latency is desired that gives instruction to the request distributor 270 which actuator 248, 249 is better suited to access the storage medium 210. Actuator 248 can be optimized for sequential access, while actuator 249 can be optimized for random access. In a different or further example, actuator 248 can be optimized for writes and actuator 249 can be optimized for reads, as head 257 has a read capability without write capability.

The storage device controller 262 can be configured to maintain separate command buffers 271 and 275 associated with the plurality of actuators (248, 249, etc.) of the storage device 220. For example, the command buffer 271 can be used to process data access commands that are associated with the actuator 248. The command buffer 275 can be used to process data access commands that are associated with the actuator 249. When the storage device controller 262 stores the requests into the command buffer 1 271, it can organize the requests into one or more batches of sequential operations. For example, requests requiring data access that are positioned near each other on the storage medium 210 can be grouped and organized into one or more batches of sequential operations so as to minimize movement of the actuator head 252.

Figure 3:
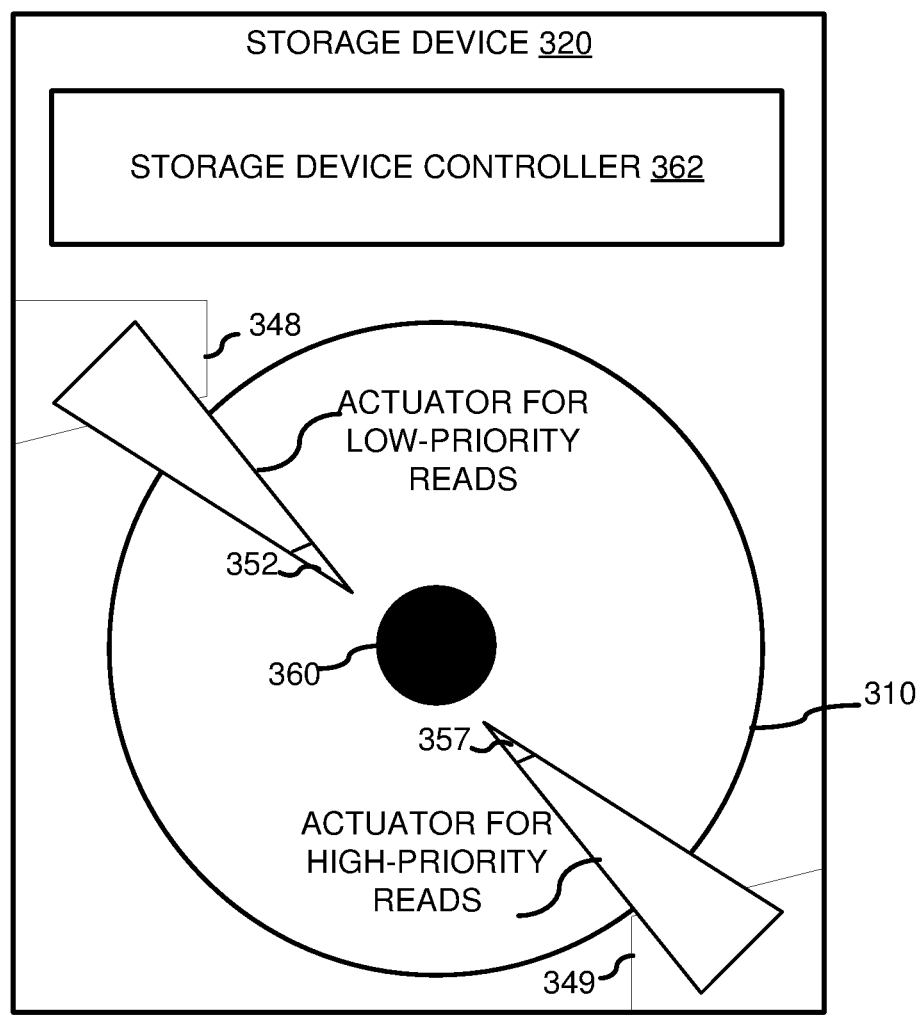
FIG. 3 is a diagram according to another embodiment, wherein a storage device selects an actuator depending on whether a request is a high- or low-priority request.

FIG. 3 shows a specific embodiment of a dual-actuator storage device 320 that includes two actuators 348, 349, wherein the actuator 348 includes a head 352 and the actuator 349 includes a head 357. The storage device 320 comprises a storage medium 310, which the actuators 348, 349 can access. The storage medium 310 is a magnetic disk that is configured to rotate on a spindle 360. The storage medium 310 is a single disk or platter, but additional disks (not shown) and actuators (not shown) are typically included in the storage device 320, such as in a stacked structure, rotating on the same spindle 360.

The storage device 320 comprises a storage device controller 362. The storage device controller 362 can be configured to access the storage medium 310. Example data access can include reading or writing data from the storage medium 310 using either actuator 348, 349. For example, the storage device controller 362 can be configured to rotate the storage medium 310 on the spindle 360 and to perform data read and/or write operations on the storage medium 310. The actuator 348 can include a read/write head 352. The actuator 349 can also include a read/write head 357. The read/write heads 352, 357 can comprise a single head that can perform both read and write operations. Alternatively, the read/write heads 352, 357 can comprise two separate heads for reading and writing, respectively. The storage device controller 362 can be configured to use the read/write head 352, 357 to write data to the storage medium 310 in multiple concentric circular tracks as the storage medium is rotated on the spindle 360. Each concentric circular track can include a plurality of storage locations wherein individual bits of data can be stored. In at least some embodiments, each actuator 348, 349 can access the same storage locations of the storage medium 310.

The storage device controller 362 can choose actuator 348 or 349 to access the storage medium 310 based on whether the read or write operation has a low priority or high priority. Actuator 348 can be designated for sequential access, while actuator 349 can be designated for random access.

The storage device controller 362 can use any of a variety of techniques for deciding whether the access is low or high priority, such as the priority bit described above. Additionally, a write request can be considered lower priority. Still further, a current position of the actuator can be used to determine if it is within a threshold distance from the read/write location. Thus, a position of a storage location to be accessed can be compared to current positions of the actuator heads 352, 357 to determine which actuator to use. Each actuator 348, 349 can have different properties related to different strategies for storage. For example, actuator 348 can be optimized for sequential access, while actuator 349 can be optimized for random access. In a further example, actuator 348 can be optimized for writes and actuator 349 can be optimized for reads. In some cases, the controller 362 does not need to receive a request, such as when moving data as part of a reorganizing procedure that can be performed as periodic maintenance. In such a case, the controller 362 can determine whether to use the first actuator or the second actuator to perform an operation on the storage medium, wherein the properties of the actuators are used in the determination. For example, for sequential reads, actuator 348 can be used, while for random reads, actuator 349 can be used. The controller 362 can then access the storage medium using the determined actuator.

Figure 4:
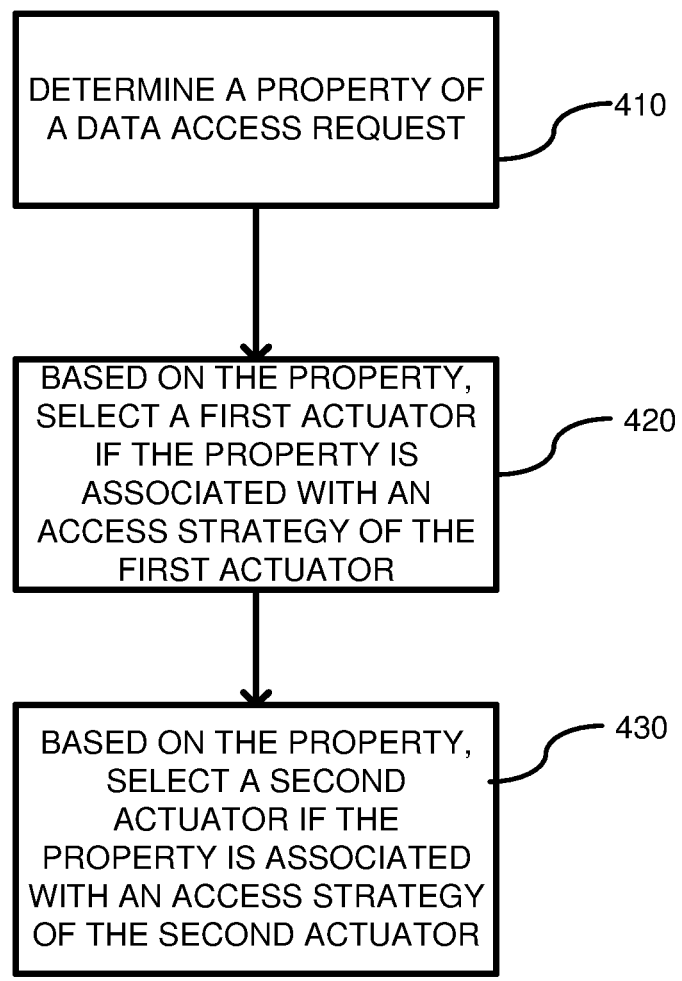
FIG. 4 is a flowchart according to another embodiment, wherein a storage device selects between actuators depending on whether a property of the request is for sequential or random access.

FIG. 4 is a flowchart according to one embodiment for accessing a storage device, such as a hard disk drive. In process block 410, a property of a data access request can be determined. For example, in FIG. 1, the I/O request 136 can request data access (i.e., read or write) and the request can have various properties, such as various header settings. One such setting is a priority bit associated with a priority of a read operation. Using the determined property, in process block 420, a storage device can select a first actuator if the property aligns with an access strategy of the first actuator (e.g., low priority reads) or can select a second actuator if the property aligns with an access strategy of the second actuator (e.g., high-priority reads)(process block 430). For example, returning to FIG. 1, the storage device can perform a data operation on the storage medium 110, which can be performed with either actuator 148 or actuator 149, wherein one of the actuators is selected based on the property in the request. Thus, using the request, the storage device 120 can select amongst two different actuators, either one of which is capable of executing the data access.

Figure 5:
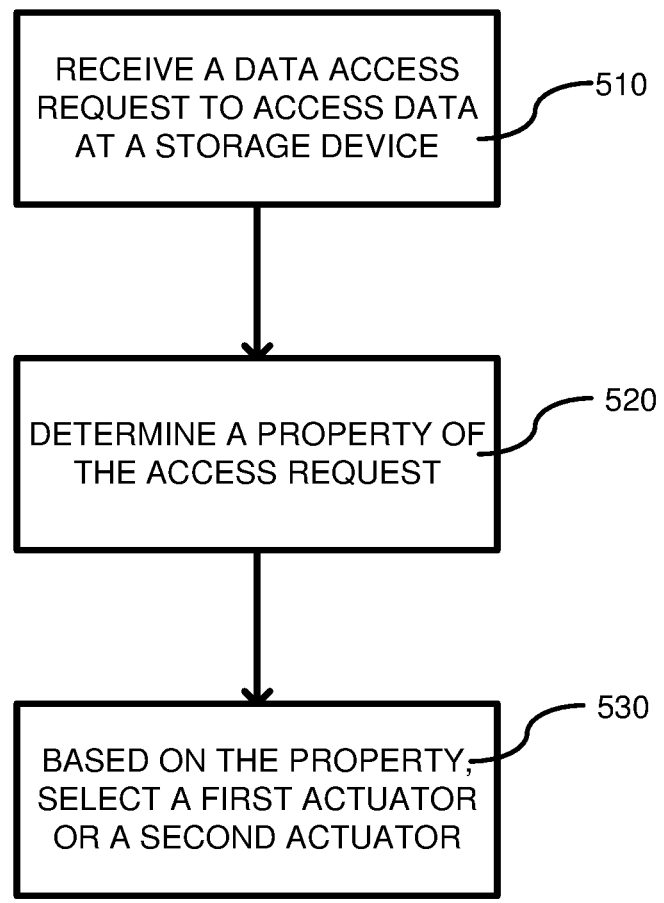
FIG. 5 is a flowchart according to another embodiment, wherein a storage device selects between actuators based upon a property of the request.

FIG. 5 is another flowchart according to a different embodiment for accessing a storage device. In process block 510, a data access request is received to access data at a storage device. The access can be a read or write request. FIG. 1 shows the request 136 being received by the storage device 120. In process block 520, a determination is made about a property of the request by parsing a header of the request to determine different fields in the header. A priority bit can be examined in the header to determine whether the request is a high-priority request or a low-priority request. Another property of the request can be based on a type of the request as to whether the request is a read operation or a write operation. All write operations can be sent to one actuator while read operations can go to either actuator based on priority requirements of the read. Finally, in process block 530, based upon the property, a first or second actuator can be selected. For example, in FIG. 2, for write operations, only actuator 248 is used. For read operations, the actuator chosen can be actuator 248 for sequential reads and actuator 249 for random reads.

Figure 6:
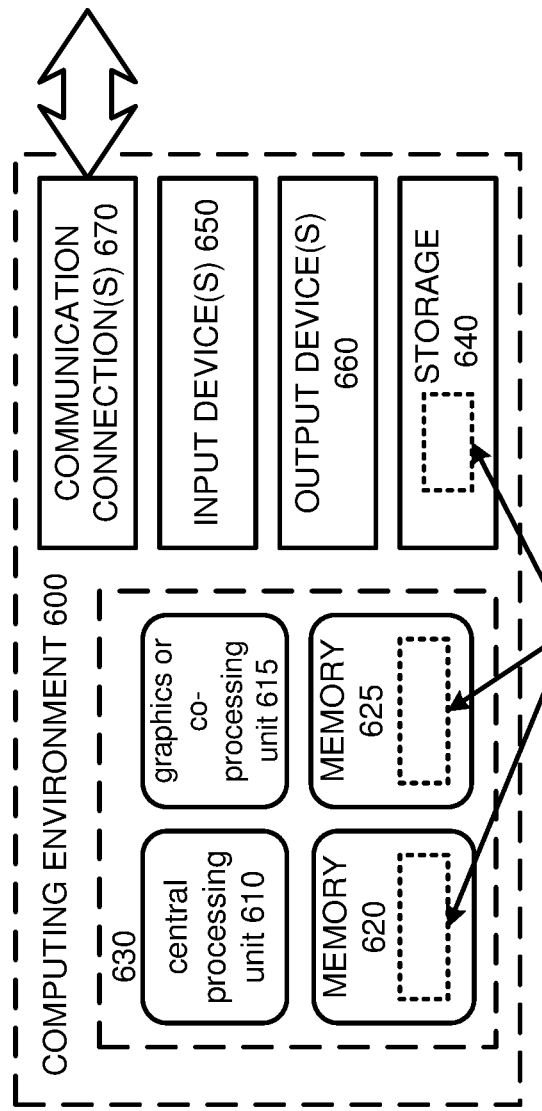
FIG. 6 depicts a generalized example of a suitable computing environment in which the described innovations may be implemented.

FIG. 6 depicts a generalized example of a suitable computing environment 600 in which the described innovations may be implemented. The computing environment 600 is not intended to suggest any limitation as to scope of use or functionality, as the innovations may be implemented in diverse general-purpose or special-purpose computing systems. For example, the computing environment 600 can be any of a variety of computing devices (e.g., desktop computer, laptop computer, server computer, tablet computer, etc.).

With reference to FIG. 6, the computing environment 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s).

A computing system may have additional features. For example, the computing environment 600 includes storage 640, one or more input devices 650, one or more output devices 660, and one or more communication connections 670. An interconnection mechanism (not shown) such as a bus, controller, or network interconnects the components of the computing environment 600. Typically, operating system software (not shown) provides an operating environment for other software executing in the computing environment 600, and coordinates activities of the components of the computing environment 600.

The tangible storage 640 may be removable or non-removable, and includes magnetic disks, magnetic tapes or cassettes, CD-ROMs, DVDs, or any other medium which can be used to store information in a non-transitory way and which can be accessed within the computing environment 600. The storage 640 stores instructions for the software 680 implementing one or more innovations described herein.

The input device(s) 650 may be a touch input device such as a keyboard, mouse, pen, or trackball, a voice input device, a scanning device, or another device that provides input to the computing environment 600. The output device(s) 660 may be a display, printer, speaker, CD-writer, or another device that provides output from the computing environment 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A system for accessing a hard drive, the system comprising:
    a host computer connected to the hard drive; and
    the hard drive, comprising a platter, a controller, a first actuator configured to access the platter and a second actuator configured to access the platter, wherein both the first and second actuators are configured to access same storage locations on the platter and wherein the first actuator is designated for sequential accesses to the platter and the second actuator is designated for random accesses to the platter;
    wherein the controller is configured to:
        determine a property of a data access request received by the controller;
        based upon the property of the data access request, select the first actuator if the property of the data access request is associated with a sequential access to the platter or select the second actuator if the property of the data access request is associated with a random access to the platter.

2. The system of claim 1, wherein the property of the data access request is a priority bit associated with the request.

3. The system of claim 1, wherein the property of the data access request is determined based on a request received by an application executing on the host computer.

4. The system of claim 1, wherein the first actuator includes both read and write heads for performing reads and writes of the platter and the second actuator includes one or more read heads.

5. The system of claim 1, wherein the controller is further configured to select the first actuator based on a type of data access.

6. A method, comprising:
receiving a data access request to access data at a storage device comprising a storage medium and first and second actuators, wherein the first and second actuators are configured to access same storage locations on the storage medium;
determining a property of the data access request; and
based upon a property of the data access request, selecting between the first actuator and the second actuator to perform the data access request, wherein the selecting includes using the first actuator for writes and sequential reads and using the second actuator for random access reads.

7. The method of claim 6, wherein determining the property of the data access request includes determining whether a priority bit in the data access request is set.

8. The method of claim 6, wherein determining the property of the data access request includes determining whether a type of the request is a write request or a read request, and selecting the first actuator for write requests.

9. The method of claim 6, wherein the first actuator has read and write heads and the second actuator has one or more read heads.

10. The method of claim 6, wherein the first actuator is associated with sequential access to the storage medium and the second actuator is associated with random access to the storage medium.

11. A storage device, comprising:
a storage medium;
a first actuator configured to access the storage medium, the first actuator having a first property associated therewith;
a second actuator configured to access the storage medium, the second actuator having a second property associated therewith; and
a storage device controller configured to:
determine whether to use the first actuator or the second actuator to access the storage medium, wherein the first and second properties are used in the determination and wherein the first property is that the first actuator is designated for sequential reads and the second property is that the second actuator is designated for random reads; and
access the storage medium using the determined actuator.

12. The storage device of claim 11, wherein the storage device controller is further configured to receive a request and determine whether to use the first or second actuator based upon whether a property of the request matches the first property of the first actuator or the second property of the second actuator.

13. The storage device of claim 11, wherein the first actuator and second actuator are configured to access same storage locations on the storage device.

14. The storage device of claim 11, wherein the access to the storage medium is a read or write operation.

15. The storage device of claim 11, wherein the storage device further comprises a third actuator configured to access same storage locations on the storage medium as the first and second actuators, and wherein the determining includes selecting between the first, second and third actuators.

16. The storage device of claim 11, wherein the first actuator has read and write heads and the second actuator has one or more read heads.

17. The storage device of claim 11, wherein the storage device controller further is configured to read from a first block of storage locations on the storage medium using the second actuator and write to a second block of storage locations on the storage medium using the first actuator so as to transfer data between the first and second blocks of storage locations on the storage medium.

18. The storage device of claim 11, wherein the storage device controller is further configured to receive a data access request and store the data access request in a first queue associated with the first actuator or a second queue associated with the second actuator.

* * * * *